(12) United States Patent
Weber

(10) Patent No.: US 6,804,738 B2
(45) Date of Patent: Oct. 12, 2004

(54) METHOD AND APPARATUS FOR SCHEDULING A RESOURCE TO MEET QUALITY-OF-SERVICE RESTRICTIONS

(75) Inventor: Wolf-Dietrich Weber, San Jose, CA (US)

(73) Assignee: Sonics, Inc., Mountain View, CA (US)

( * ) Notice: Subject to any disclaimer, the term of this patent is extended or adjusted under 35 U.S.C. 154(b) by 537 days.

(21) Appl. No.: 09/977,602

(22) Filed: Oct. 12, 2001

(65) Prior Publication Data

US 2003/0074507 A1 Apr. 17, 2003

(51) Int. Cl.[7] .......................... G06F 13/14; G06F 12/00
(52) U.S. Cl. ................... 710/244; 710/45; 710/117; 710/124; 370/395.21; 370/395.41; 370/395.42; 370/395.43; 711/151
(58) Field of Search ................... 710/240–244, 710/117, 124, 45; 711/147–153; 370/229–234, 345–348, 395.2–395.43

(56) References Cited

U.S. PATENT DOCUMENTS

| | | | |
|---|---|---|---|
| 5,218,456 A | | 6/1993 | Stegbauer et al. |
| 5,274,769 A | | 12/1993 | Ishida |
| 5,287,464 A | | 2/1994 | Kumar et al. |
| 5,363,484 A | | 11/1994 | Desnoyers et al. |
| 5,469,473 A | | 11/1995 | McClear et al. |
| 5,530,901 A | | 6/1996 | Nitta |
| 5,557,754 A | | 9/1996 | Sone et al. |
| 5,664,153 A | | 9/1997 | Farrell |
| 5,748,629 A | * | 5/1998 | Caldara et al. ............. 370/389 |
| 5,809,538 A | | 9/1998 | Pollmann et al. |
| 5,917,804 A | * | 6/1999 | Shah et al. ................. 370/230 |
| 5,926,649 A | | 7/1999 | Ma et al. |
| 5,982,780 A | | 11/1999 | Bohm et al. |
| 5,996,037 A | | 11/1999 | Emnett |
| 6,023,720 A | | 2/2000 | Aref et al. |
| 6,092,137 A | | 7/2000 | Huang et al. |
| 6,104,690 A | | 8/2000 | Feldman et al. |
| 6,122,690 A | | 9/2000 | Nannetti et al. |
| 6,167,445 A | | 12/2000 | Gai et al. |
| 6,253,269 B1 | | 6/2001 | Cranston et al. |
| 6,330,225 B1 | | 12/2001 | Weber et al. |
| 6,335,932 B2 | | 1/2002 | Kadambi et al. |
| 6,363,445 B1 | | 3/2002 | Jeddeloh |
| 6,628,609 B2 | * | 9/2003 | Chapman et al. ............ 370/229 |
| 6,636,482 B2 | * | 10/2003 | Cloonan et al. ............. 370/230 |
| 2002/0174227 A1 | * | 11/2002 | Hartsell et al. ............. 709/226 |
| 2003/0079080 A1 | * | 4/2003 | DeMoney ................... 711/112 |

OTHER PUBLICATIONS

Lamport, Leslie; How to Make a Multiprocessor Computer That Correctly Executes Multiprocess Programs, IEEE Transactions On Computers, vol. C–28, No. 9, Sep. 1979, pp. 690–691.
Rixner, Scott, et al., Memory Access Scheduling, To appear in ISCA–27 (2000), Computer Systems Laboratory, Stanford University, Stanford, CA 94305, pp. 1–11.
Search Report for PCT/US02/05438, mailed May 24, 2002, 1 page.
Search Report for PCT/US02/05288, mailed May 20, 2002, 1 page.
Search Report for PCT/US02/05439, mailed Jun. 26, 2002, 1 page.
Search Report for PCT/US02/05287, mailed Jul. 11, 2002, 2 pages.
Rixner et al., "A Bandwidth–Efficient Architecture for Media Processing", Micro–31, 1998, pp. 1–11.

\* cited by examiner

*Primary Examiner*—Sumati Lefkowitz
(74) *Attorney, Agent, or Firm*—Blakely, Sokoloff, Taylor & Zafman LLP

(57) ABSTRACT

The present invention is directed to a method and apparatus for scheduling a resource to meet quality of service guarantees. In one embodiment of three levels of priority, if a channel of a first priority level is within its bandwidth allocation, then a request is issued from that channel. If there are no requests in channels at the first priority level that are within the allocation, requests from channels at the second priority level that are within their bandwidth allocation are chosen. If there are no requests of this type, requests from channels at the third priority level or requests from channels at the first and second levels that are outside of their bandwidth allocation are issued. The system may be implemented using rate-based scheduling.

27 Claims, 3 Drawing Sheets

METHOD AND APPARATUS FOR SCHEDULING A RESOURCE TO MEET QUALITY-OF-SERVICE RESTRICTIONS

FIELD OF THE INVENTION

The field of the invention relates to a system where access to a resource is scheduled to provide a particular quality-of-service to two or more requestors competing for access to that resource.

BACKGROUND

In computer systems it is common that a given resource (such as a system bus, a memory bank, etc.) is shared between several competing requesting devices or processes ("requesters") that would like to make use of the resource. Access to that resource therefore has to be arbitrated, in order to determine which requestor can access the resource when there are concurrent and conflicting requests to the resource. It is desirable to be able to specify different quality-of-service (QOS) guarantees for different requestors in order for the system to operate properly. Examples of QOS guarantees include data bandwidth and latency. For example, it may be desirable to allow a processor to have very high-priority and therefore low-latency access to a memory system. Another example is that one might want a video system to have a certain reserved bandwidth on a system bus so that the video screen can be updated as required at a fixed frame rate.

Existing arbitration schemes that aim to provide QOS guarantees include fixed-priority arbitration and time division multiplexing. In fixed-priority arbitration each requester is assigned a fixed priority and requesters are serviced in priority order. In time division multiplexing, each requestor is pre-allocated a certain set of fixed access periods during which it can access the resource. While these arbitration schemes have their value in certain systems, they fall short of providing QOS guarantees when there is a mix of requesters with different QOS requirements and perhaps unpredictable request arrival times. For example, it is not possible to give any kind of bandwidth guarantee to multiple different requesters if fixed-priority arbitration is used unless the exact request pattern of each initiator is known a priori. Time division multiplexing is inefficient when the arrival times of requests are not deterministic, or when the requests require differing amounts of service time from the resource depend on the type of request or the recent history of other requests.

What is desired is a resource scheduling scheme that can provide different QOS guarantees to different requestors and further can efficiently handle non-deterministic arrival and service times.

SUMMARY OF THE INVENTION

The present invention is directed to a method and apparatus for scheduling a resource to meet quality of service guarantees. In one embodiment of three levels of priority, if a channel of a first priority level is within its bandwidth allocation, then a request is issued from that channel. If there are no requests in channels at the first priority level that are within the allocation, requests from channels at the second priority level that are within their bandwidth allocation are chosen. If there are no requests of this type, requests from channels at the third priority level or requests from channels at the first and second levels that are outside of their bandwidth allocation are issued. The system may be implemented using rate-based scheduling.

BRIEF DESCRIPTION OF THE DRAWINGS

The objects, features and advantages of the invention will be apparent from the following detailed description in which.

DETAILED DESCRIPTION

Figure 1:
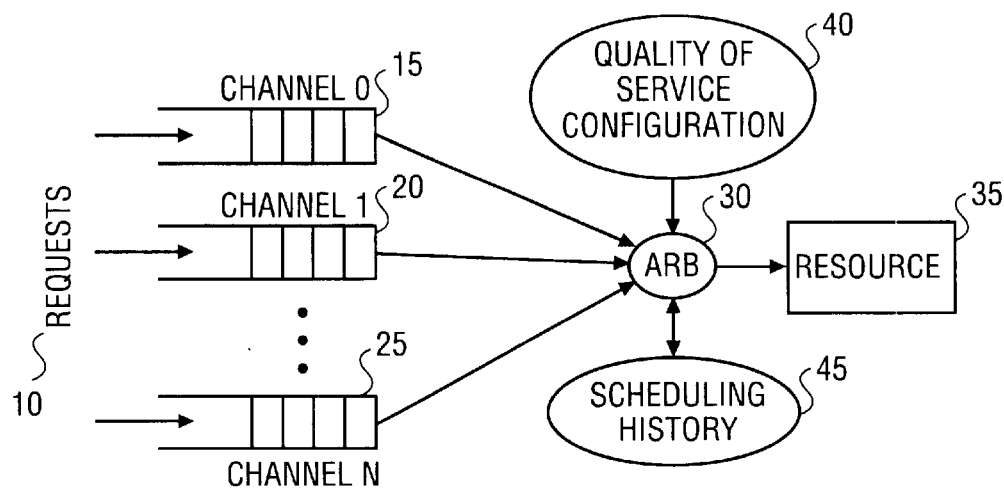
FIG. 1 is a simplified diagram of one embodiment of an arbitration system that operates in accordance with the technology of the present invention.

FIG. 1 shows one embodiment of an arbitration system. Requests 10 arrive from different requesting devices or processes and are stored in a channel, e.g., channels 15, 20, 25 that are contemplated to be logically or physically implemented. In this embodiment, each channel accommodates requests from one requestor. Thus, requests from device A are stored in channel 0 (15), requests from device B are stored in channel 1 (20), etc. In the present embodiment, it is assumed here that requests within each channel are serviced in the order they are received in each channel, but this is not a necessary requirement for the invention described herein.

The arbitration unit 30 is responsible for scheduling access by each channel to the resource 35. A resource can be a variety of different apparatuses or processes, including memory and the like. The arbitration unit 30 is configured with the desired quality-of-service (QOS) guarantees for each of the channels using the QOS configuration unit 40. QOS may include a variety of criteria including one or more minimum, maximum or ranges of performance criteria for a particular dataflow, process or device. The unit 30 also keeps track of recent scheduling decisions using the scheduling history unit 45. Although the QOS unit 40 and scheduling history unit 45 are illustrated as separate units, it is readily apparent that the functionality of one or both of the quality of service configuration unit 40 and scheduling history unit 45 can be configured to be part of the arbitration unit 30 or joined into a single unit coupled to the arbitration unit 30. Further, it is contemplated that the one or more of the units 30, 40, 45 may be physically part of the resource 35.

If more than one channel 15, 20, 25 has a request waiting for service, the arbitration unit 30 selects the channel that can proceed to service using the scheduling history and desired QOS information retrieved respectively from the scheduling history unit 45 and quality of service configuration unit 40. The next request of the selected channel proceeds to access the resource and exits the system.

In one embodiment, the arbiter 30 uses the scheduling history 45 to determine if certain QOS guarantees can be met. For example, it is possible that the amount of time needed to access the resource depends on the relative timing of access of the resource or the type of request. For example, when accessing a bi-directional system bus, it may take longer for a write request to access the bus if it has recently been accessed with a read request, because the bus direction may need to be turned around first. This information may be determined from the scheduling history 45 and in turn affects the scheduling history 45. As noted above, the amount of time needed to access the resource may also depend on the type of request. For example, when accessing a dynamic random access memory (DRAM) memory system, a request to an open DRAM page might take much less time than a request to a closed DRAM page.

In one embodiment, the different QOS modes used for scheduling may include priority service, allocated-bandwidth service and best-effort service. Each channel is assigned one QOS mode. For a channel to receive priority service or allocated-bandwidth service, it must be given a bandwidth allocation. Priority service provides bandwidth guarantees up to the allocated bandwidth, plus minimum latency service. Allocated-bandwidth service provides only bandwidth guarantees up to the allocated bandwidth. Best-effort service provides no QOS guarantees, and may actually receive no service at all. Additional quality-of-service modes are possible.

Further arbitration, e.g., using the scheduling history, may be used to determine selection of one of a plurality of pending requests at the same level of QOS. For example, if the scheduling history indicates the resource, e.g. a bus, has been operating in one direction, the arbiter may grant priority to requests arguing operation in that same direction.

In the present embodiment, each of the channels 15, 20, 25 are allocated one QOS mode and this information is placed in the QOS configuration unit 40. In order to allocate bandwidth to different channels, it is important to calculate the overall bandwidth available in the resource that is being accessed. This total bandwidth may be relatively easy to calculate, or it may depend on the request stream itself and must therefore be estimated using a particular expected request stream for a particular system. For example, when estimating the total available bandwidth of a DRAM system, it may be necessary to estimate the expected fraction of page hits and page misses in the request stream. When it is not possible to make a precise estimate of the total available bandwidth, a conservative estimate should be made that can be achieved under all or substantially all foreseeable conditions in the given system.

In the present embodiment, priority channels and allocated-bandwidth channels are all allocated a certain amount of bandwidth. In order to meet the QOS guarantees under all conditions, no more than the total available bandwidth of the resource should be allocated to these channels.

Channels using a priority QOS mode or allocated-bandwidth mode receive a higher QOS than channels that use a best-effort mode, but only while the channels continue to operate within their respective bandwidth allocation. It is possible for a channel to request more than its allocated bandwidth, but in this case the QOS may degrade to below or equal best-effort channels.

Figure 2:
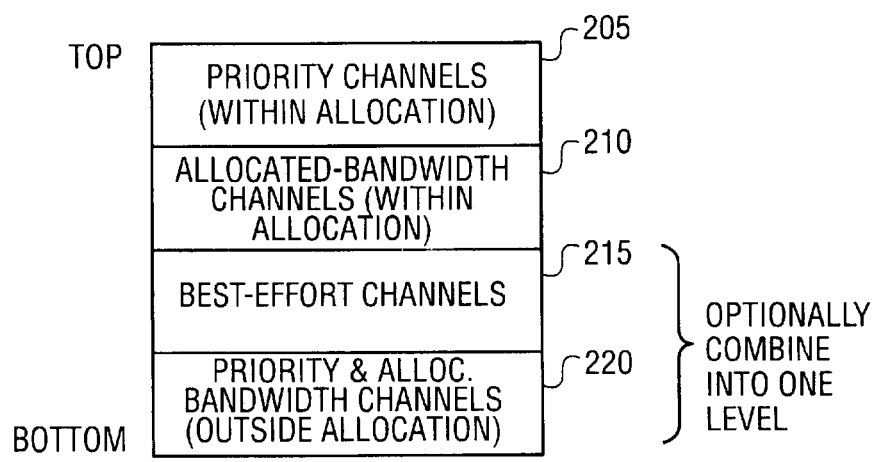
FIG. 2 illustrates one embodiment of priority order.

FIG. 2 illustrates one example of the priority order in which channels get access to a resource. The top level 205 is reserved for priority channels that are within their bandwidth allocation. If there are any channels with requests in this category, they are provided access (serviced) as soon as possible, thus achieving low-latency access to the resource. The next lower level 210 is for allocated-bandwidth channels that are within their bandwidth allocation. Thus, if there are no eligible priority requests, allocated-bandwidth requests are serviced. Best-effort channels and priority or allocated-bandwidth channels that are outside of their allocated bandwidth are serviced with the lowest priority. These two groups can either be combined or serviced as two separate priorities 215, 220 as shown in FIG. 2.

Using this scheduling method, allocated bandwidth and priority channels are substantially guaranteed to receive their allocated bandwidth. Amongst the two, priority channels are serviced with a higher priority, so these channels experience a lower access latency to the resource. If and when the priority and allocated-bandwidth channels are not using up the total available bandwidth of the resource, best-effort and other channels that are outside of their allocation can make use of the resource, thus ensuring that the resource does not sit idle while there are requests waiting.

Figure 3:
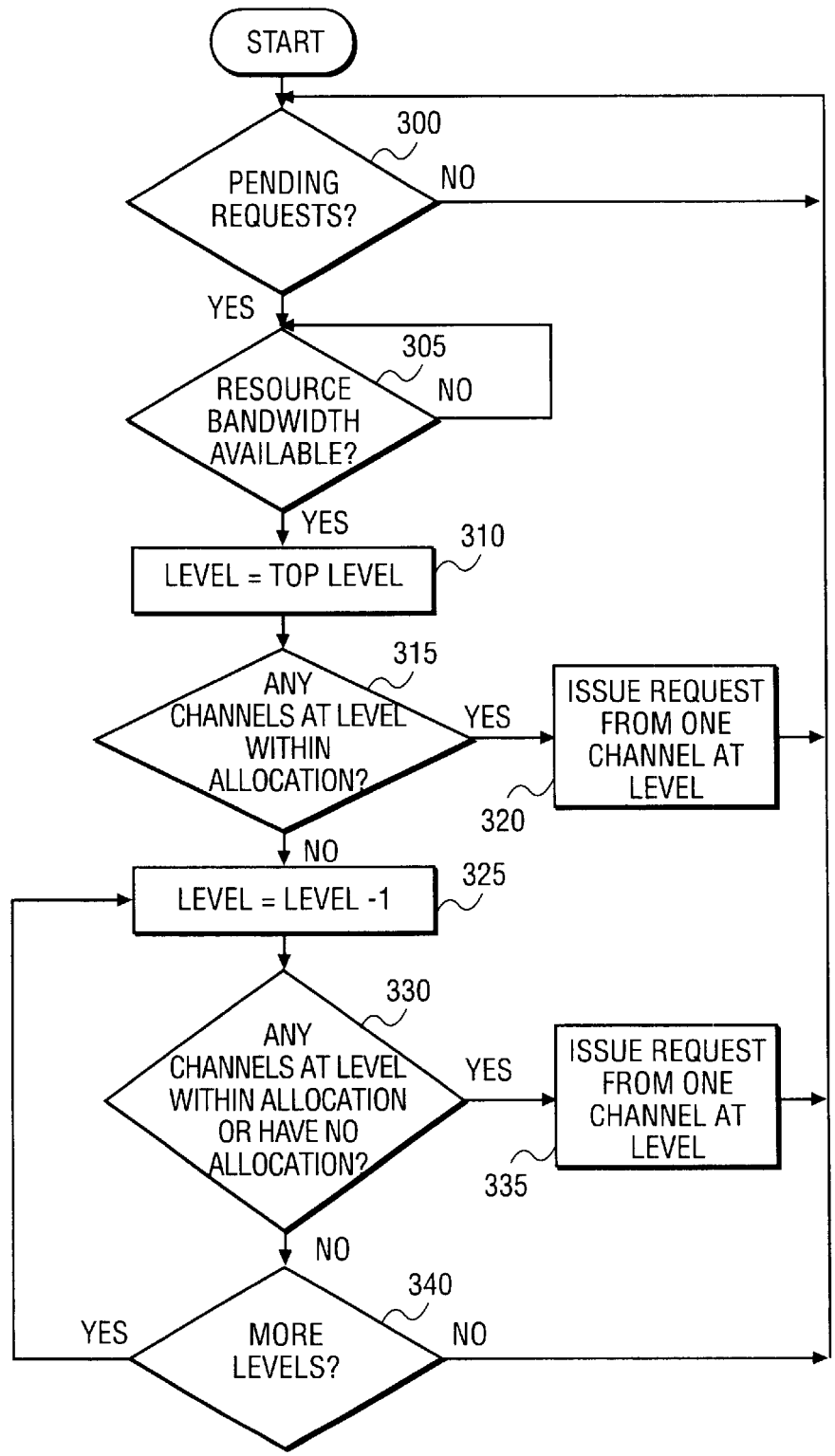
FIG. 3 is a simplified flow diagram illustrating one embodiment of an arbiter.

FIG. 3 illustrates one embodiment of an arbitration process. For purposes of discussion, it is assumed that one channel is assigned to each level. However, it is contemplated that multiple channels can be operative at the same level. At step 300, if there are pending requests to be service by a particular resource, and resource bandwidth is available, step 305, a first level, for example, the level with the highest priority of service is examined, step 310. At step 315, if any requests from channels at the first level are within their bandwidth allocation, a request is issued from one channel of the first level, step 320. If requests from channels at the first level are not within allocation, requests from channels at the next level, which in one embodiment are channels at a level of a next-lower priority, are examined, step 325. If the channels at the level are within allocation, or alternately are not assigned an allocation bandwidth, step 330, a request is issued from a channel of that level, step 335. This process continues, step 340, for each level of channels.

Figure 4:
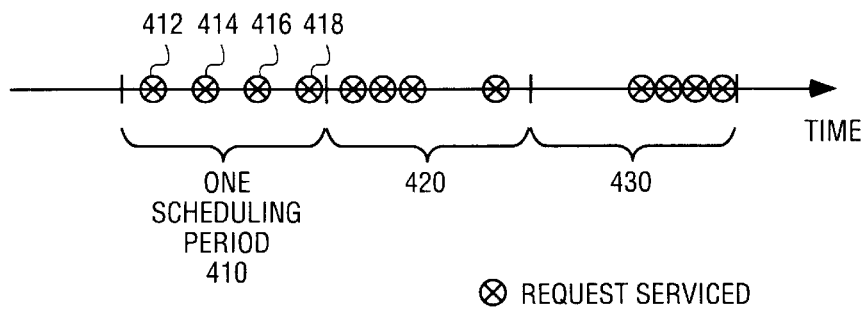
FIG. 4 illustrates an embodiment of rate-based scheduling.

Utilizing the scheduling system of the present invention, the system can determine whether a given channel is operating within or beyond its allocated bandwidth. One way to implement this mechanism is described by the embodiment of FIG. 4. As shown in FIG. 4, time is divided into equal-sized scheduling periods, for example, periods 410, 420, 430. Bandwidth is allocated on the basis of a fixed number of requests per scheduling period. The scheduling unit decides to schedule those requests at any suitable time during the scheduling period. For purposes of discussion, this scheduling method is referred to as "rate-based" scheduling. By allowing the scheduling unit to schedule requests at any time during the scheduling period it does not rely on a known request arrival time. Furthermore, the scheduling unit is able to schedule requests so as to maximize the efficiency of the resource. In the example of FIG. 4, four requests 412, 414, 416, 418 are always being scheduled in each scheduling period, but the exact time that each request is processed by the resource varies from scheduling period, e.g., period 420, to scheduling period, e.g., period 430.

Figure 5:
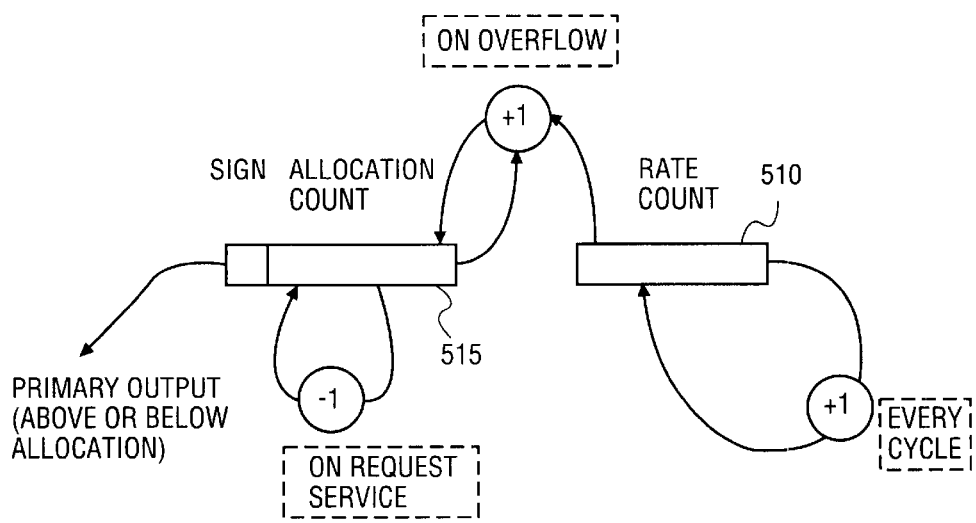
FIG. 5 is a simplified diagram illustrating one embodiment of rate-based scheduling in accordance with the teachings of the present invention.

One embodiment of rate-based scheduling is shown in FIG. 5. The advantage of this embodiment is that it requires very little state-just two counters per channel. The mechanism shown is for one channel and is sufficient to determine whether the given channel is above or below its bandwidth allocation. Multiple versions of this can be implemented to support multiple channels. In addition, it is contemplated that the functionality described can be implemented a variety of ways.

A rate counter 510 is incremented at some small periodic interval, such as once every cycle. In the present embodiment, the rate counter 510 is configured to have a maximum value that is based on the allocated bandwidth of the channel. For example, if the bandwidth allocated to a particular channel is ten requests during each 100-cycle scheduling period, then the rate counter would be set up with a maximum value of 10.

Once the rate counter 510 reaches its maximum value, it causes the allocation counter 515 to be incremented, thus signaling that there is one more request "credit" available for that channel. The rate counter 510 resets and begins counting again. In one embodiment the rate counter is implemented as a simple register or location in memory with associated logic to test the value of the counter. Alternately, the overflow bit of the counter may be used to increment the allocation counter 515 and reset the rate counter 510.

Each time a request is sent from that channel to the resource, the allocation counter is decremented, thus removing a credit. As long as the allocation count is positive, the channel is operating within its bandwidth allocation.

In one embodiment, the allocation count does not go beyond the number of requests allocated per scheduling period (either positive or negative). Saturation logic is included to insure that the allocation count does not exceed a specified saturation value. For example, a register or memory corresponding to counter 515 may include control logic that would not change the value in the counter beyond positive saturation value or negative saturation value. This enables the bandwidth use history to fade with time, allowing a channel to use more than its allocation during certain periods when bandwidth is available, while still maintaining the bandwidth guarantees when bandwidth becomes tight again.

While the above-described scheduling method is suitable for all kinds of systems that have multiple requestors competing for a shared resource, it is particularly well suited for shared dynamic random access memory (DRAM) memory systems. DRAM systems are especially difficult to schedule, because the service time of each request depends on the request type (e.g., read or write, burst size, etc.) and the request history which determines whether a particular request hits a page that is open or whether a page must first be opened before it can be accessed. Given a conservative estimate of the bandwidth that can be achieved with a certain set of request streams from different initiating (requestor) devices or processes, the described scheduling method can guarantee different QOS to different requesters while achieving a very high DRAM efficiency.

The invention has been described in conjunction with the preferred embodiment. It is evident that numerous alternatives, modifications, variations and uses will be apparent to those skilled in the art in light of the foregoing description.

What is claimed is:

1. A method comprising:
   determining if a resource is available to service requests;
   if resource bandwidth is available;
      if at least one channel of a first level comprises at least one request and is within allocation, issuing at least one request from at the least one channel of the first level;
      if the channel of the first level does not comprise at least one of at least one request and exceeds allocation, and if a channel of a second level comprises at least one request, issuing a request from the channel of the second level,
   keeping track of a channel's bandwidth usage history by incrementing a rate counter every unit cycle and by incrementing an allocation counter every predetermined number of rate count and decrementing the allocation counter each time a request is received from a channel.

2. The method as set forth in claim 1, wherein if the channel of the first level does not comprise at least one of at least one request and exceeds allocation, and if the channel of the second level does not comprise at least one of at least one request and exceeds allocation, and a channel of a third level comprises at least one request, issuing a request from the channel of the third level.

3. The method as set forth in claim 1, wherein if the channel of the first level comprises at least one request and exceeds allocation, issuing requests from the channel of the second level until the channel of the first level is within allocation, wherein requests of channels of the first level are given priority when operating within allocation.

4. The method as set forth in claim 1, wherein if the channel of the first level exceeds allocation, reassigning the channel to a third level lower in priority to the first level and second level such that requests of the channel of the first level are issued after requests of the channel of the second level.

5. The method as set forth in claim 4, wherein if the channel originally of the first level and currently at the third level is operating within allocation, reassigning the channel to the first level.

6. The method as set forth in claim 1, further comprising referencing at least one scheduling history of requests, said issuing also based upon the at least one scheduling history.

7. The method as set forth in claim 1, wherein the levels are representative of Quality of Service guarantees (QOS).

8. The method as set forth in claim 1, wherein the levels are representative of channels characterized from the group consisting of priority channels, allocated bandwidth channels and best effort channels.

9. The method as set forth in claim 1, wherein at least one channel comprises multiple requests, wherein ordering of issuance of requests within a channel is substantially independent of the issuance of requests from the channel to the resource.

10. A method comprising:
    determining if a resource is available to service requests;
    if resource bandwidth is available;
       if at least one channel of a first level comprises at least one request and is within allocation, issuing at least one request from at the least one channel of the first level;
       if the channel of the first level does not comprise at least one of at least one request and exceeds allocation, and if a channel of a second level, lower in priority than the first level, comprises at least one request, issuing a request from the channel of the second level; and
    if the channel of the first level does not comprise at least one of at least one request and exceeds allocation, and if the channel of a second level does not comprise at least one request, issuing a request from a channel of the first level which exceeds allocation,
    keeping track of a channel's bandwidth usage history by incrementing a rate counter every unit cycle and by incrementing an allocation counter every predetermined number of rate count and decrementing the allocation counter each time a request is received from a channel.

11. The method as set forth in claim 10, wherein if the channel of the first level does not comprise at least one of at least one request and exceeds allocation, and if the channel of the second level does not comprise at least one of at least one request and exceeds allocation, and a channel of a third level comprises at least one request, the third level lower in priority than the first level and second level issuing a request from the channel of the third level.

12. The method as set forth in claim 10, wherein if the channel of the first level comprises at least one request and exceeds allocation, issuing requests from the channel of the second level until the channel of the first level is within allocation, wherein requests of channels of the first level are given priority when operating within allocation.

13. The method as set forth in claim 10, wherein if the channel of the first level exceeds allocation, reassigning the channel to a third level lower in priority to the first level and second level such that requests of the channel of the first level are issued after requests of the channel of the second level.

14. The method as set forth in claim 13, wherein if the channel originally of the first level and currently at the third level is operating within allocation, reassigning the channel to the first level.

15. The method as set forth in claim 11, wherein channels of the first level comprise priority channel, channels of the second level comprise allocated bandwidth channels and channels of the third level comprise best effort channels.

16. An arbiter coupled to receive requests from channels of a plurality of levels, each level comprising at least one channel configured to control conveyance of requests for a resource to process, said arbiter configured to determine if the resource is available to service requests, and if resource bandwidth is available and if at least one channel of a first level comprises at least one request and is within allocation, said arbiter controlling issuance of at least one request from at the least one channel of the first level; and if the channel of the first level does not comprise at least one of at least one request and exceeds allocation, and if a channel of a second level comprises at least one request, said arbiter controlling issuance of at least one request from the channel of the second level said arbiter further comprising a rate counter and allocation counter, the rate counter incremented every unit cycle, the allocation counter incremented every predetermined number of rate count and decremented each time a request is received from the channel.

17. The arbiter as set forth in claim 16, wherein each level represents a priority of Quality of Service (QOS) guarantees.

18. The arbiter as set forth in claim 16, further comprising a scheduling history and identifications of quality of service (QOS) guarantees for the channels, said arbiter further controlling issuance of at least one request based upon the scheduling history and QOS guarantees.

19. The arbiter as set forth in claim 18, wherein the scheduling history comprises bandwidth usage, said arbiter further comprising linked counters to keep track of a channel's bandwidth usage history.

20. The arbiter as set forth in claim 18, wherein the scheduling history comprises bandwidth usage, said arbiter further comprising saturation logic such that the history of bandwidth usage of a channel is within a range specified by a saturation usage value.

21. The arbiter as set forth in claim 16, wherein the arbiter is further configured, if the channel of the first level does not comprise at least one of at least one request and exceeds allocation, and if the channel of the second level does not comprise at least one of at least one request and exceeds allocation, and a channel of a third level comprises at least one request, to issue a request from the channel of the third level.

22. The arbiter as set forth in claim 16, wherein the arbiter arbitrates requests to a dynamic random access memory (DRAM).

23. A system comprising:
   at least one priority channel comprising at least one request for service from a resource, said priority channel providing a first predetermined allocation;
   at least one allocated-bandwidth channel comprising at least one request for service from the resource, said allocated-bandwidth channel providing a second predetermined allocation; and
   an arbiter comprising logic configured to determine ordering of requests using a rate-based scheduling process, wherein the arbiter comprises a rate counter and allocation counter, the rate counter incremented every unit cycle, the allocation counter incremented every predetermined number of rate count and decremented each time a request is received from a channel.

24. The system as set forth in claim 23, wherein the resource is a dynamic random access memory (DRAM).

25. A system comprising:
   at least one priority channel comprising at least one request for service from a resource, said priority channel providing a first predetermined allocation;
   at least one allocated-bandwidth channel comprising at least one request for service from the resource, said allocated-bandwidth channel providing a second predetermined allocation; and
   an arbiter comprising logic configured to determine ordering of requests using a rate-based scheduling process, where the rate-based scheduling process comprises incrementing a rate count every unit cycle, incrementing a first allocation count every predetermined number of rate count and decrementing the first allocation count each time a priority channel request is received, wherein when the first allocation count is below a specified threshold, requests from the allocated-bandwidth channel are processed before requests from the priority channel.

26. The system as set forth in claim 25, wherein the threshold corresponds to a saturation value, the first allocation count saturating at least one of the positive saturation value and negative saturation value.

27. The system as set forth in claim 23, wherein the allocation counter saturates at a saturation value such that the allocation counter value is within a range defined by positive saturation value and negative saturation value.

* * * * *